US009987675B2

(12) United States Patent
Thomas

(10) Patent No.: US 9,987,675 B2
(45) Date of Patent: Jun. 5, 2018

(54) MANUFACTURE OF WELL TOOLS WITH MATRIX MATERIALS

(75) Inventor: Jeffrey G. Thomas, Magnolia, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 802 days.

(21) Appl. No.: 14/378,992

(22) PCT Filed: May 30, 2012

(86) PCT No.: PCT/US2012/039925
§ 371 (c)(1),
(2), (4) Date: Aug. 15, 2014

(87) PCT Pub. No.: WO2013/180695
PCT Pub. Date: Dec. 5, 2013

(65) Prior Publication Data
US 2014/0374171 A1 Dec. 25, 2014

(51) Int. Cl.
B21K 5/04 (2006.01)
B23P 15/32 (2006.01)
(Continued)

(52) U.S. Cl.
CPC ............... B21K 5/04 (2013.01); B23P 15/32 (2013.01); B28B 1/008 (2013.01); B28B 1/08 (2013.01); C04B 35/5626 (2013.01); C04B 35/64 (2013.01); C22C 1/1036 (2013.01); C22C 26/00 (2013.01); C22C 29/08 (2013.01); E21B 10/00 (2013.01); E21B 10/46 (2013.01); B22F 2005/001 (2013.01)

(58) Field of Classification Search
CPC .... B21K 5/02; B21K 5/04; B21K 5/10; B23P 15/32; B22F 2005/001; E21B 10/00; E21B 10/46
USPC .............................................. 76/108.1–108.6
See application file for complete search history.

(56) References Cited

U.S. PATENT DOCUMENTS 3,757,878 A 9/1973 Wilder et al.
3,757,879 A 9/1973 Wilder et al.
(Continued)

OTHER PUBLICATIONS

Office Action received from Canadian Patent Application No. 2875110, dated Jan. 13, 2016; 3 pages, Jan. 13, 2016.
(Continued)

Primary Examiner — Jason Daniel Prone
(74) Attorney, Agent, or Firm — Baker Botts L.L.P.

(57) ABSTRACT

A method of manufacturing a well tool can include loading a matrix material into a mold, then sintering the matrix material in the mold; and then loading another matrix material into the mold. A well tool can include a longitudinal axis, an erosion resistant layer exposed to one or more erosive factors when the well tool is installed in a well, and a support layer which supports the erosion resistant layer. The erosion resistant and support layers can include respective matrix materials, and the erosion resistant layer can extend greater than approximately 1.27 cm in a direction parallel to the longitudinal axis. Another method of manufacturing a well tool can include forming a rigid layer from a powdered matrix material; and then infiltrating both that matrix material and another matrix material with a hot liquid binder material.

17 Claims, 7 Drawing Sheets

(51) Int. Cl.
*E21B 10/00* (2006.01)
*E21B 10/46* (2006.01)
*C22C 1/10* (2006.01)
*C22C 26/00* (2006.01)
*C22C 29/08* (2006.01)
*B28B 1/00* (2006.01)
*B28B 1/08* (2006.01)
*C04B 35/56* (2006.01)
*C04B 35/64* (2006.01)
*B22F 5/00* (2006.01)

(56) References Cited

U.S. PATENT DOCUMENTS

| | | | |
|---|---|---|---|
| 4,499,795 A | 2/1985 | Radtke | |
| 4,624,830 A | 11/1986 | Barr | |
| 4,694,919 A * | 9/1987 | Barr | B22F 7/06 76/108.2 |
| 4,723,996 A * | 2/1988 | Brunet | B22F 9/08 373/138 |
| 4,780,274 A | 10/1988 | Barr | |
| 4,804,049 A * | 2/1989 | Barr | B22F 7/06 175/428 |
| 4,884,477 A | 12/1989 | Smith et al. | |
| 4,884,777 A * | 12/1989 | Sakamoto | B60N 2/502 248/575 |
| 4,991,670 A * | 2/1991 | Fuller | E21B 10/567 175/428 |
| 5,000,273 A * | 3/1991 | Horton | C04B 35/52 76/108.2 |
| 5,089,182 A * | 2/1992 | Findeisen | C01B 32/949 264/8 |
| 5,090,491 A | 2/1992 | Tibbitts et al. | |
| 5,373,907 A | 12/1994 | Weaver | |
| 5,441,121 A | 8/1995 | Tibbitts | |
| 5,967,248 A * | 10/1999 | Drake | B22F 7/06 76/108.2 |
| 6,073,518 A | 6/2000 | Chow et al. | |
| 6,089,123 A | 7/2000 | Chow et al. | |
| 6,095,265 A * | 8/2000 | Alsup | E21B 10/006 175/379 |
| 6,209,420 B1 | 4/2001 | Butcher et al. | |
| 6,354,362 B1 | 3/2002 | Smith et al. | |
| 6,551,551 B1 * | 4/2003 | Gegel | B22F 3/225 228/194 |
| 6,581,671 B2 | 6/2003 | Butcher et al. | |
| 7,350,599 B2 * | 4/2008 | Lockwood | C22C 26/00 175/374 |
| 7,398,840 B2 | 7/2008 | Ladi et al. | |
| 7,878,275 B2 * | 2/2011 | Lockwood | C22C 1/051 76/108.2 |
| 8,109,177 B2 * | 2/2012 | Kembaiyan | B22F 7/06 76/108.1 |
| 8,211,203 B2 * | 7/2012 | Sheng | C22C 19/07 175/374 |
| 8,261,632 B2 * | 9/2012 | Stevens | B22F 7/062 76/108.4 |
| 8,342,268 B2 * | 1/2013 | Lockstedt | B22F 1/0096 175/374 |
| 8,347,990 B2 * | 1/2013 | Lockwood | E21B 10/42 76/108.2 |
| 8,616,089 B2 * | 12/2013 | Choe | B22D 19/14 76/108.4 |
| 8,925,422 B2 * | 1/2015 | Lockwood | E21B 10/42 76/108.2 |
| 2003/0029642 A1 * | 2/2003 | Dykstra | E21B 10/42 175/57 |
| 2004/0244540 A1 * | 12/2004 | Oldham | B22F 7/06 76/108.2 |
| 2004/0245024 A1 | 12/2004 | Kembaiyan | |
| 2005/0183892 A1 * | 8/2005 | Oldham | E21B 7/20 175/402 |
| 2006/0231293 A1 * | 10/2006 | Ladi | B22D 19/06 76/108.2 |
| 2007/0017160 A1 * | 1/2007 | Caldwell | B24D 3/00 51/298 |
| 2007/0107942 A1 * | 5/2007 | Overstreet | C23C 30/005 175/57 |
| 2008/0164070 A1 * | 7/2008 | Keshavan | E21B 10/55 175/374 |
| 2010/0193254 A1 | 8/2010 | Lind et al. | |
| 2010/0206639 A1 * | 8/2010 | Lockwood | C22C 29/06 175/374 |
| 2010/0206640 A1 * | 8/2010 | Lockwood | C22C 29/08 76/108.2 |
| 2011/0000718 A1 * | 1/2011 | Bankes | E21B 10/00 76/108.2 |
| 2011/0114394 A1 | 5/2011 | Lockwood et al. | |
| 2011/0120781 A1 * | 5/2011 | Lockwood | B29C 43/003 175/425 |
| 2013/0312927 A1 * | 11/2013 | Thomas | B22D 19/06 164/108 |

OTHER PUBLICATIONS

Office Action received from Chinese Patent Application No. 201280073297.3, dated Aug. 26, 2015; 30 pages, Aug. 26, 2015.
Office Action received from Chinese Patent Application No. 201280073297.3, dated Apr. 5, 2016; 29 pages, Apr. 5, 2016.
Office Action received from Chinese Patent Application No. 201280073297.3, dated Oct. 8, 2016; 3 pages, Oct. 8, 2016.
International Preliminary Report on Patentability issued in PCT/US2012/039925; 10 pages, dated Dec. 11, 2014.
International Search Report with Written Opinion dated Apr. 3, 2013 for PCT Patent Application No. PCT/US2012/039925, 14 pages.

* cited by examiner

MANUFACTURE OF WELL TOOLS WITH MATRIX MATERIALS

CROSS-REFERENCE TO RELATED APPLICATION

This application is a national stage under 35 USC 371 of International Application No. PCT/US12/39925, filed on 30 May 2012. The entire disclosure of this prior application is incorporated herein by this reference.

TECHNICAL FIELD

This disclosure relates generally to equipment utilized and operations performed in conjunction with a subterranean well and, in one example described below, more particularly provides for manufacture of well tools with matrix materials.

BACKGROUND

Various types of well tools can be exposed to one or more erosive factors in well operations. For example, surfaces of drilling tools (e.g., drill bits, reamers, stabilizers, etc.) can be eroded by factors such as abrasive fluid flow, scraping against a wall of a wellbore, impact against an earth formation, etc. Unfortunately, erosion resistant materials are typically very brittle.

It will, thus, be appreciated that improvements are continually needed in the art of manufacturing well tools. Such improvements could enhance erosion resistance of well tools, or otherwise improve performance, reduce cost, increase efficiency, etc., of the well tools. Other improvements could include maintaining present erosion resistance, while improving strength, ductility, toughness, impact strength, reducing cost, etc.

DETAILED DESCRIPTION

Figure 1:
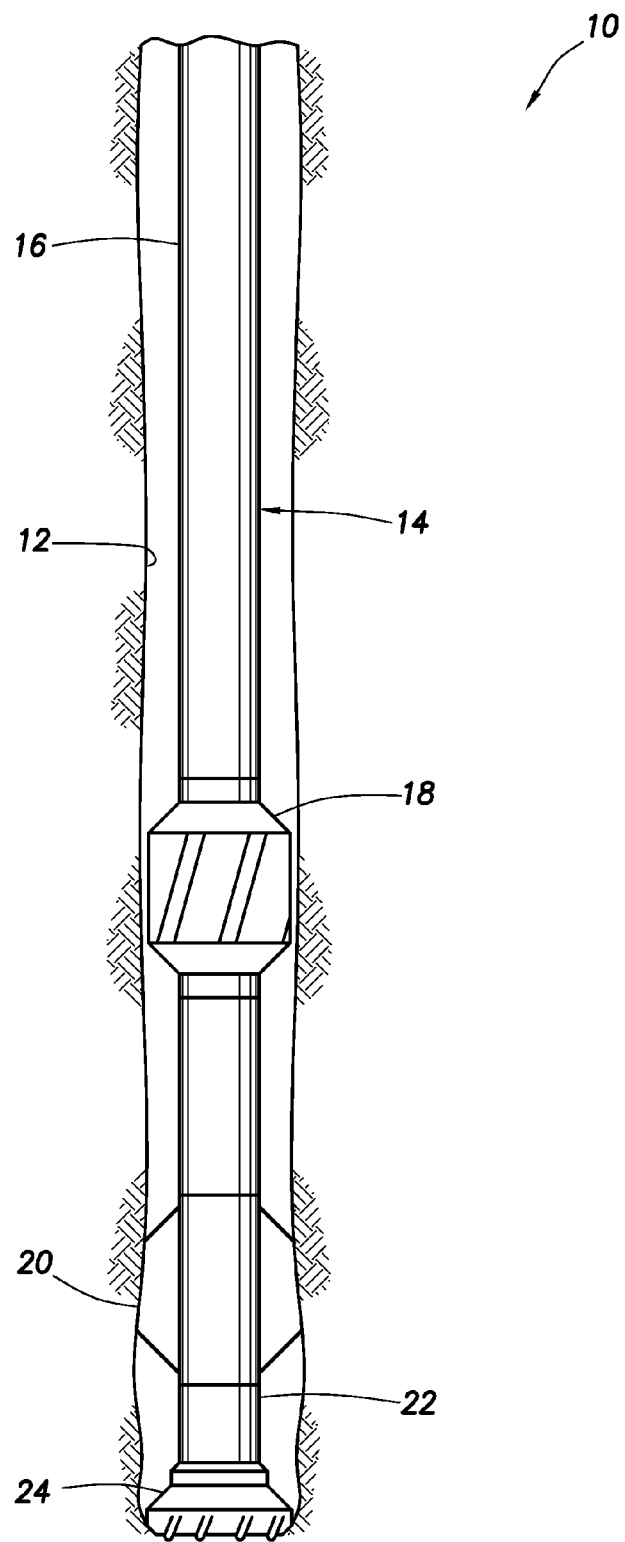
FIG. 1 is a representative partially cross-sectional view of a well system and associated method which can embody principles of this disclosure.

Representatively illustrated in FIG. 1 is a system 10 for use with a well, and an associated method, which can embody principles of this disclosure. However, it should be clearly understood that the system 10 and method are merely one example of an application of the principles of this disclosure in practice. A wide variety of other examples are possible. Therefore, the scope of this disclosure is not limited at all to the details of the system 10 and method described herein and/or depicted in the drawings.

In the FIG. 1 example, a wellbore 12 is being drilled with a drill string 14. The drill string 14 includes various well tools 16, 18, 20, 22, 24. In this example, the well tool 16 comprises one or more drill collars, the well tool 18 is a stabilizer, the well tool 20 is a reamer, the well tool 22 is an adapter or crossover, and the well tool 24 is a drill bit.

Many other well tools could be included in the drill string 14. Different combinations, arrangements and numbers of well tools can be used in other examples. Therefore, the scope of this disclosure is not limited to any particular type, number, arrangement or combination of well tools.

The well tool 24 is used as an example in the further description below to demonstrate how the principles of this disclosure can be applied in actual practice. However, it should be clearly understood that the scope of this disclosure is not limited to manufacture of drill bits or any other particular type of well tool. Any well tool (including but not limited to well tools which are exposed to one or more erosive factors during well operations) can benefit from the principles of this disclosure.

Figure 2:
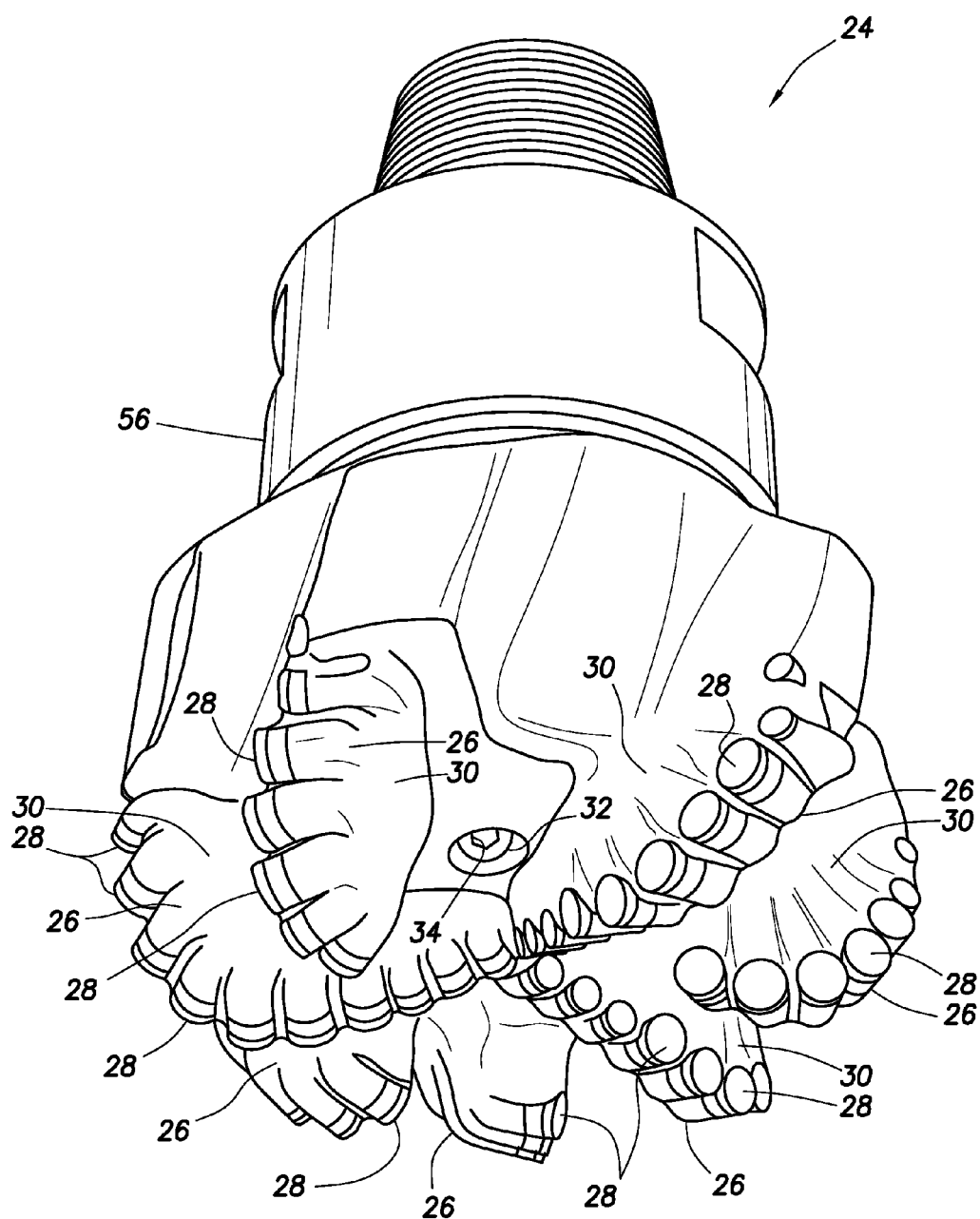
FIG. 2 is a representative perspective view of a well tool which can embody the principles of this disclosure, and which can be used in the system of FIG. 1.

Referring additionally now to FIG. 2, an enlarged scale view of the well tool 24 is representatively illustrated. In this view, it may be seen that the well tool 24 is of the type known to those skilled in the art as a fixed cutter drill bit. However, other types of drill bits (e.g., coring bits, "impreg" bits, etc.) can be used in other examples.

The drill bit depicted in FIG. 2 includes multiple downwardly and outwardly extending blades 26. Each blade 26 has mounted thereon multiple polycrystalline diamond compact (PDC) inserts 28 for cutting into an earth formation.

The blades 26 have opposing faces 30 which are exposed to various erosive factors, such as, scraping against a formation wall, abrasive flow of drilling mud emanating from nozzles 32 in the drill bit, impacts against the formation as part of a drilling operation, etc.

It would be beneficial to be able to protect the faces 30 of the blades 26 from erosion, no matter the cause or type of the erosion. It would also be beneficial to be able to increase the erosion resistance of the drill bit without unduly increasing a cost of manufacturing the drill bit, or decreasing a performance or efficiency of the drill bit.

Figure 6:
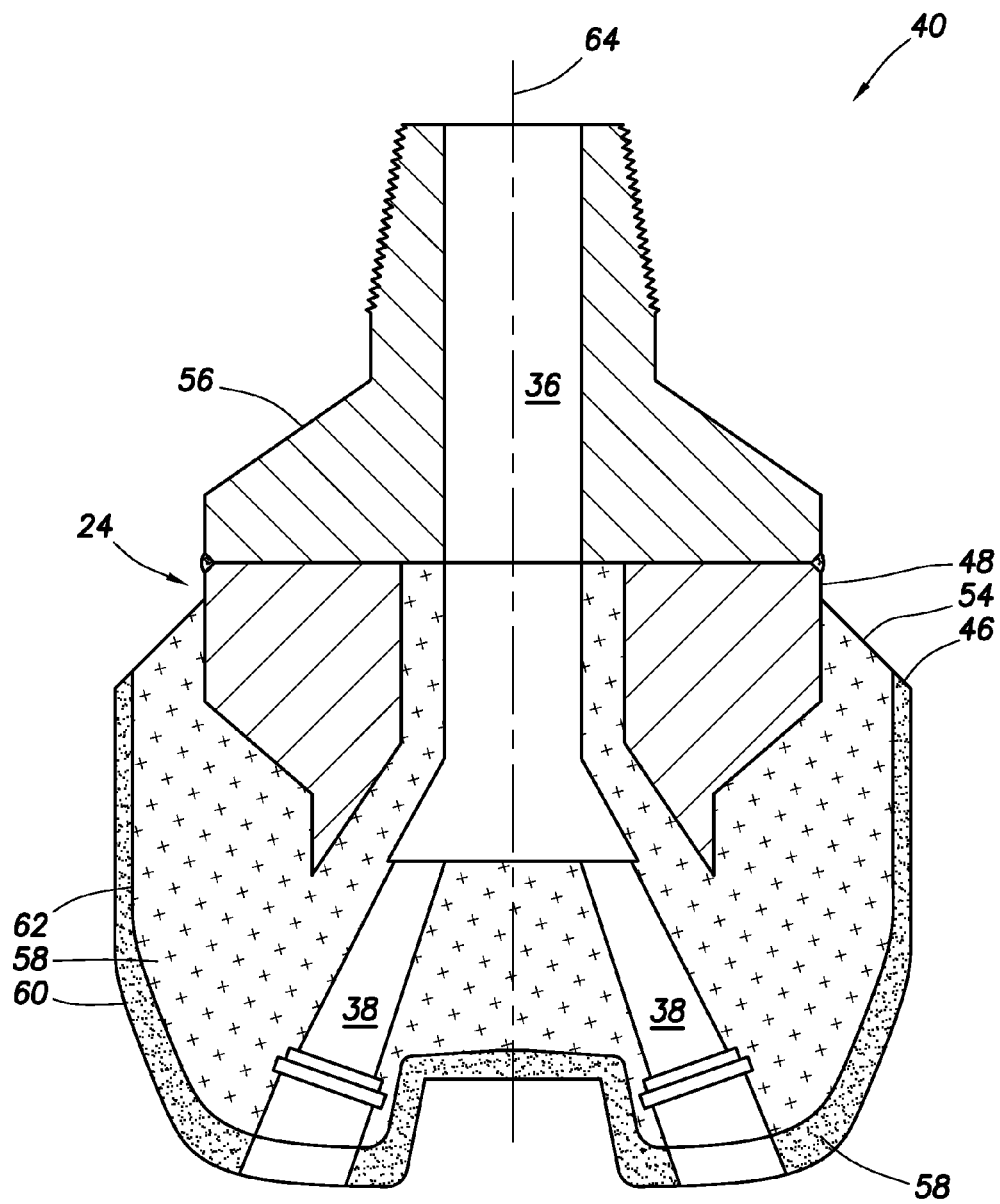

Additional portions of the drill bit which can benefit from the principles described below include internal flow passages 34, 36, 38. The flow passages 34 are formed in the nozzles 32, and the flow passages 36, 38 are depicted in FIG. 6. These passages 34, 36, 38 are exposed to flow of abrasive drilling mud, and could benefit from increased erosion resistance.

Cost savings, increases in performance and efficiency, and an increase in erosion resistance can be obtained in certain examples by incorporation of the principles described herein. However, it is not necessary, in keeping with the scope of this disclosure, for any particular benefit or combination of benefits to be obtained.

For example, aside from erosion, the bit head and blades 26 in particular are subject to high dynamic loading from impact and drilling vibrations, etc. Such loading can make impact strength, ductility and toughness more important, and may limit a material's design criteria for blade standoff and thickness, thereby undesirably reducing junk slot area between the blades 26.

The blades 26 are external features of the drill bit, and the flow passages 34, 36, 38 are internal features of the drill bit. In the further description below, an example of how the erosion resistance of the external faces 30 of the blades 26 can be improved is described. However, the principles of this disclosure can be used to enhance features of a well tool, whether those features are internal or external.

Note that the faces 30 of the blades 26 extend vertically upward a substantial distance. In the past, in order to make drill bit blades more erosion resistant, they have been constructed of erosion resistant matrix materials, such as initially powdered tungsten carbide.

Unfortunately, powders have an angle of repose of only about 30-50 degrees, and so, if they were piled a substantial vertical distance along a side of a mold, the mold would be substantially filled from that distance down with the relatively expensive erosion resistant tungsten carbide powder. It would be beneficial to be able to achieve a substantial vertical distance of erosion resistant matrix material along a well tool surface, while limiting the amount of the matrix material used. This can reduce material cost, and can produce other benefits, such as toughness and impact strength.

Another advantage of this technique is that the entire face of the bit could contain an outer layer of more erosion resistant material. Due to the laborious nature of prior methods, the enhanced material could only be applied in select regions of the bit, such as only on the tops and fronts of the blade 26 surfaces, but not on the backs of the blades or in the junk slots between the blades.

Referring additionally now to FIGS. 3-6, examples of steps in a method 40 of manufacturing the well tool 24 are representatively illustrated. The method 40 may be used to manufacture the well tool 24, to manufacture any of the other well tools 16, 18, 20, 22 described above, or to manufacture any other type of well tool. Such a well tool may be used in the system 10 of FIG. 1, or in any other system.

Figure 3:
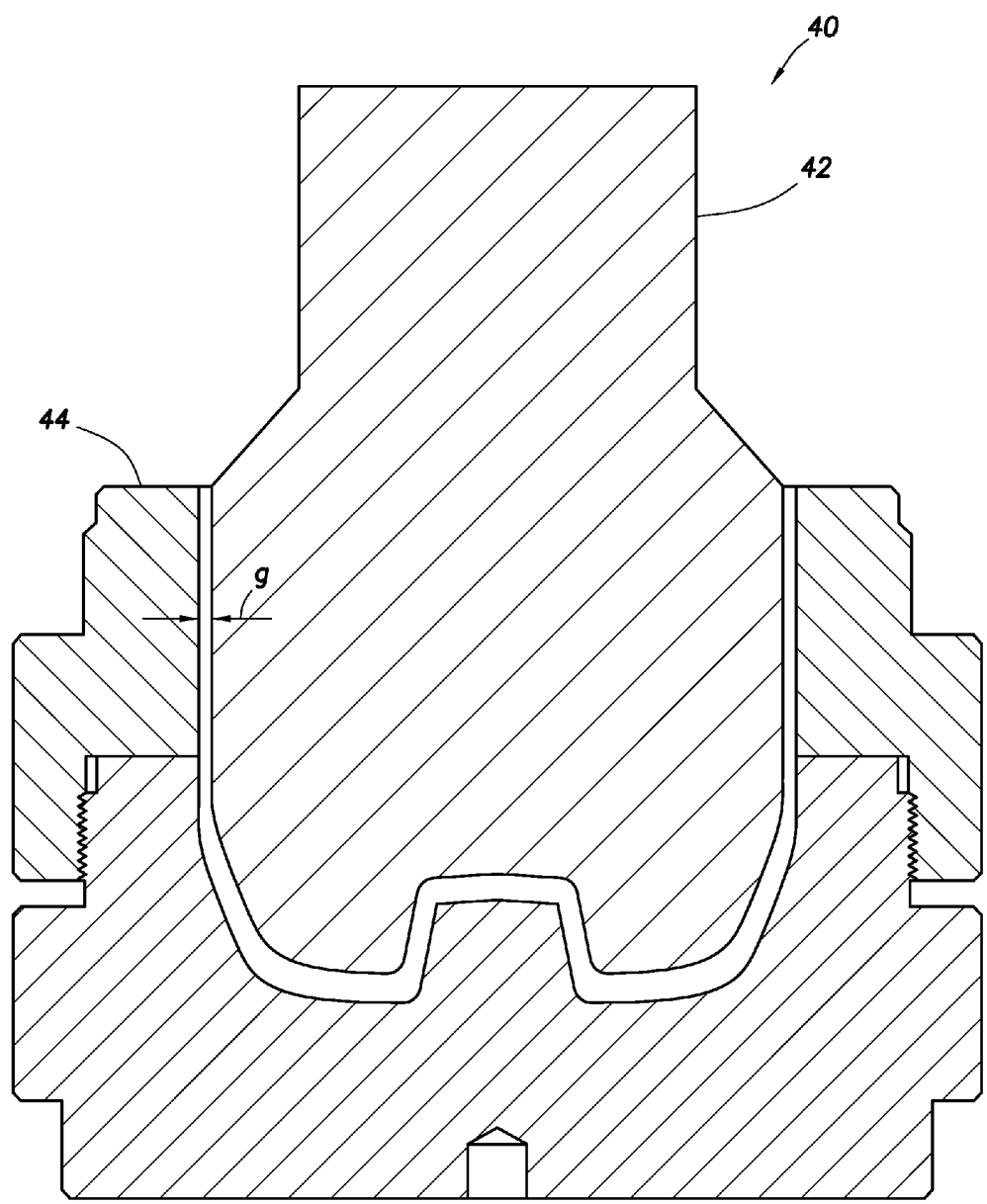
FIGS. 3-6 are representative cross-sectional views of the well tool in successive steps of a method of manufacturing the well tool.

In the FIG. 3 example, a mandrel 42 is installed in a mold 44 configured for forming a drill bit. A jig (not shown) can be used to position the mandrel 42 in the mold 44. The jig can in one example rest on the mold 44 and be used to vary a gap g on the bottom of the mold by raising or lowering the mandrel 42 with a vertical adjustment.

The mold 44 can include recesses for forming the blades 26, pockets for eventually receiving the inserts 28, etc. For clarity, the mold 44 is illustrated in simplified form, but in actual practice a shape of the mold can be as complex as needed for forming the internal and/or external features of the drill bit.

The mandrel 42 could be made of materials such as graphite, resin bonded sand, steel, tool steel, nickel alloys, or other materials. The mandrel 42 could be made from any material that does not melt at or below temperatures used for sintering (described more fully below).

If resin bonded sand is used, the resin can volatize in the sintering process. Without resin, the sand would have no structural integrity, but once the powdered matrix material is loaded in the gap described below, the presence of the loose sand will prevent the powered matrix material from sloughing. The loose sand can make it easier to remove the mandrel 42 from the mold 44 after sintering. The sand could be vacuumed or poured out at that time.

If the mandrel 42 material is coherent after sintering, the mandrel can be configured with a draft for convenient removal of the mandrel from the mold 44. A multiple piece (e.g., clam-shell) mandrel 42 could be used to create internal layers and/or features in situations where a one piece mold would not allow for removal of the mandrel after sintering the powdered matrix material in the mold.

In the FIG. 3 example, a gap g exists between the mandrel 42 and the mold 44. As described more fully below, this gap g will contain an erosion resistant powdered matrix material. The gap g is external to the mandrel 42 and internal to the mold 44 in this example, but in other examples gaps could be internal to a mandrel and/or external to a mold (e.g., if it is desired to produce an erosion resistant layer on an interior surface of a well tool, such as in the passages 38 or other water courses).

Figure 4:
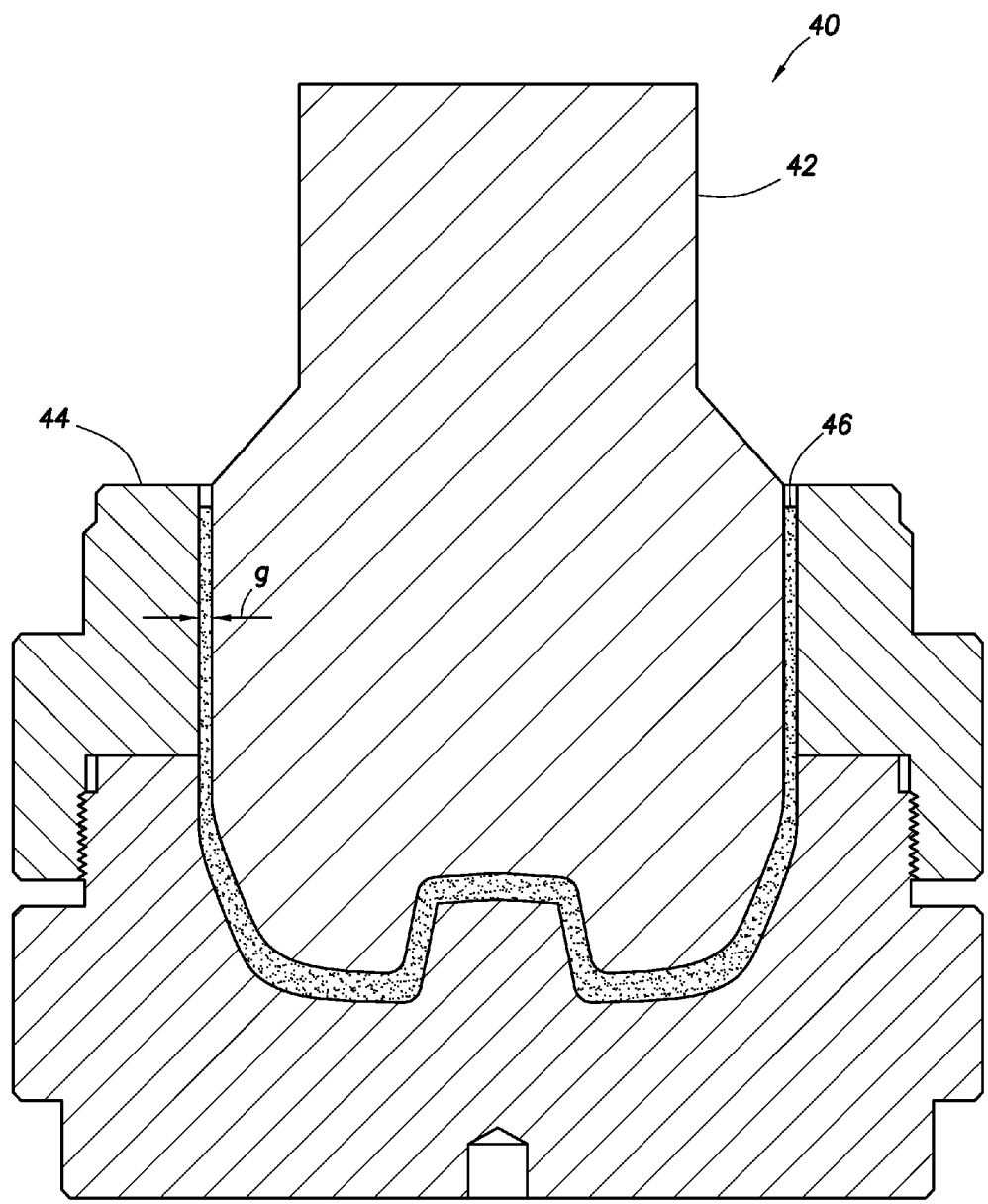

As depicted in FIG. 4, the erosion resistant matrix material 46 is loaded into the gap g in the mold 44. Vibration may be used to ensure filling of the entire gap g with a consistent density of the matrix material 46.

The size of the gap g may vary depending on the thickness of the layer desired. The gap g can also vary due to the ability of the powder to free flow into a certain size gap. It is expected that more-flowable powders will be capable of filling a smaller gap size than less-flowable powders.

A green strength of a rigid layer which results from the sintering process may be affected by the powder type, chemistry and binding agent, and sintering variables such as time and temperature. Thicker gap g sizes may be desirable for layers with lower green strength.

The matrix material 46 preferably comprises a tungsten carbide material in powdered form. Suitable tungsten carbide materials include D63™ and PREMIX 300™, marketed by HC Starck of Newton, Mass. USA. Other matrix materials may be used, as well.

The matrix material 46 can comprise a blend of matrix powders. A binding agent (such as, copper, nickel, iron, alloys of these, an organic tackifying agent, etc.) can be mixed with the matrix material 46 prior to loading the matrix material into the mold 44.

An effective binding agent can be any material that would bind, soften or melt at the sintering temperatures, and not burnoff or degrade at those temperatures. High-temperature binding agents can comprise compositions having softening temperatures of about 260° C. (500° F.) and above. As used herein, the term "softening temperature" refers to the temperature above which a material becomes pliable, which is typically less than a melting point of the material.

Examples of suitable high-temperature binding agents can include copper, nickel, cobalt, iron, molybdenum, chromium, manganese, tin, zinc, lead, silicon, tungsten, boron, phosphorous, gold, silver, palladium, indium, titanium, any mixture thereof, any alloy thereof, and any combination thereof. Non-limiting examples may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, and the like. Further, high-temperature binding agents may include diamond catalysts, e.g., iron, cobalt and nickel.

Certain matrix materials may not require binding agents. Matrix powders comprising iron, nickel, cobalt or copper can bond through solid state diffusion processes during the sintering process. Other matrix materials that have very high melting temperatures (e.g., W, WC, diamond, BN, and other nitrides and carbides) may utilize a binding agent, because the high temperatures which produce solid state diffusion may be uneconomical or undesirable.

It is not necessary for the matrix material 46 to comprise tungsten carbide. A matrix powder or blend of matrix powders useful here generally lends erosion resistance to a resulting hard composite material, including a high resistance to abrasion and wear. The matrix powder can comprise particles of any erosion resistant materials which can be bonded (e.g., mechanically) with a binder to form a hard composite material. Suitable materials may include, but are not limited to, carbides, nitrides, natural and/or synthetic diamonds, steels, stainless steels, austenitic steels, ferritic steels, martensitic steels, precipitation-hardening steels, duplex stainless steels, iron alloys, nickel alloys, cobalt alloys, chromium alloys, and any combination thereof.

In the FIG. 4 example, the matrix material 46 can comprise tungsten carbide (WC). Various types of tungsten carbide may be used, including, but not limited to, stoichiometric tungsten carbide particles, cemented tungsten carbide particles, and/or cast tungsten carbide particles.

The first type of tungsten carbide, stoichiometric tungsten carbide, may include macrocrystalline tungsten carbide and/or carburized tungsten carbide. Macrocrystalline tungsten carbide is essentially stoichiometric WC in the form of single crystals, but some multicrystals of WC may form in larger particles.

Macrocrystalline tungsten carbide may comprise additions of cast carbide, Ni, Fe, Carbonyl of Fe, Ni, etc. Macrocrystalline tungsten carbide may also have characteristics such as hardness, wettability and response to contaminated hot, liquid binder materials which are different from cemented carbides or spherical carbides. Methods of manufacturing macrocrystalline tungsten carbide are known to those of ordinary skill in the art.

Carburized tungsten carbide, as known in the art, is a product of the solid-state diffusion of carbon into tungsten metal at high temperatures in a protective atmosphere. Carburized tungsten carbide grains are typically multi-crystalline (e.g., they are composed of WC agglomerates). The agglomerates may form grains that are larger than individual WC crystals. Typical carburized tungsten carbide may contain a minimum of 99.8% by weight of carbon infiltrated WC, with a total carbon content in the range of about 6.08% to about 6.18% by weight.

The second type of tungsten carbide, cemented tungsten carbide, may include sintered spherical tungsten carbide and/or crushed cemented tungsten carbide. The terms "cemented carbide" and "cemented carbides" can include WC, MoC, TiC, TaC, NbC, $Cr_3C_2$, VC and solid solutions of mixed carbides, such as WC—TiC, WC—TiC—TaC, WC—TIC—(Ta,Nb)C in a particulate binder (matrix) phase.

The binder materials used to form cemented carbides may sometimes be referred to as "bonding materials" to help distinguish between binder materials used to form cemented carbides and binder materials used to form a hard composite material (and well tools incorporating the hard composite materials). Cemented carbides may sometimes be referred to as "composite" carbides or sintered carbides. Sintered tungsten carbide is commercially available in two basic forms: crushed and spherical (or pelletized).

Crushed sintered tungsten carbide is produced by crushing sintered components into finer particles, resulting in more irregular and angular shapes, whereas pelletized sintered tungsten carbide is generally rounded or spherical in shape. The particulate bonding material provides ductility and toughness which often results in greater resistance to fracture (toughness) of cemented carbide pellets, spheres or other configurations as compared to cast carbides, macrocrystalline tungsten carbide and/or formulates thereof.

A typical process for making cemented tungsten carbide generally includes providing a tungsten carbide powder having a predetermined size (or within a selected size range), and mixing the powder with a suitable quantity of cobalt, nickel, or other suitable bonding material. The mixture is typically prepared for sintering by either of two techniques: it may be pressed into solid bodies often referred to as green compacts, or alternatively, the mixture may be formed into granules or pellets, such as by pressing through a screen, or tumbling and then screened to obtain more or less uniform pellet size.

Such green compacts or pellets are then heated in a controlled atmosphere furnace to a temperature near the melting point of cobalt (or the like) to cause the tungsten carbide particles to be bonded together by the metallic phase. Sintering globules of tungsten carbide yields spherical sintered tungsten carbide.

Crushed cemented tungsten carbide may further be formed from the compact bodies or by crushing sintered pellets or by forming irregular shaped solid bodies. The particle size, morphology, and quality of the sintered tungsten carbide can be tailored by varying the initial particle size of tungsten carbide and cobalt, controlling the pellet size, adjusting the sintering time and temperature, and/or repeated crushing larger cemented carbides into smaller pieces until a desired size is obtained.

The third type of tungsten carbide, cast tungsten carbide, may include spherical cast tungsten carbide and/or crushed cast tungsten carbide. Cast tungsten carbide has approximately the eutectic composition between bitungsten carbide, $W_2C$, and monotungsten carbide, WC. Cast tungsten carbide is typically made by heating tungsten in contact with carbon.

Processes for producing spherical cast carbide particles are known to those of ordinary skill in the art. For example, tungsten may be heated in a graphite crucible having a hole through which a resultant eutectic mixture of $W_2C$ and WC may drip. This liquid may be quenched in a bath of oil and may be subsequently crushed to a desired particle size to form what is referred to as crushed cast tungsten carbide.

Alternatively, a mixture of tungsten and carbon is heated above its melting point into a constantly flowing stream which is poured onto a rotating cooling surface, typically a water-cooled casting cone, pipe, or concave turntable. The molten stream is rapidly cooled on the rotating surface and forms spherical particles of eutectic tungsten carbide, which are referred to as spherical cast tungsten carbide.

Additional materials useful as matrix powder or as part of a matrix powder blend include, but are not limited to, silicon nitride ($Si_3N_4$), silicon carbide (SiC), boron carbide ($B_4C$) and cubic boron nitride (CBN). The term "cubic boron nitride" refers to an internal crystal structure of boron atoms and nitrogen atoms in which the equivalent lattice points are at the corner of each cell.

Boron nitride particles typically have a diameter of approximately one micron and appear as a white powder. Boron nitride, when initially formed, has a generally graphite-like, hexagonal plate structure. When compressed at high pressures (such as, $6.9 \times 10^6$ kPa) cubic boron nitride particles will be formed with a hardness very similar to diamonds.

The various materials useful as a matrix powder may be selected so as to provide a blend of matrix powder and a final hard composite material that is tailored for a particular application. For example, the type, shape, and/or size of a particulate material used in the formation of a hard composite material may affect the material properties of the material, including, for example, fracture toughness, transverse rupture strength, and erosion resistance.

A matrix powder with a relatively larger particle size distribution may be at least partly responsible for improved erosion resistance of a hard composite material formed using a polymodal blend of matrix powder. Similarly, a matrix powder with a smaller particle size distribution may be at least partly responsible for maintaining mechanical properties (e.g., fracture toughness, transverse rupture strength, etc.) of a hard composite material formed from a polymodal blend of matrix powder.

The binder material can include copper, cobalt, nickel, iron, zinc, manganese, tin, any alloys of these elements, any combinations thereof, or any other material satisfactory for use in forming a hard composite material comprising the matrix powder described above. Such binder materials generally provide desired ductility, toughness and thermal conductivity for an associated hard composite material.

Binder materials may cooperate with the particulate material(s) present in the matrix powders to form hard composite materials with enhanced erosion resistance. A suitable commercially available binder material is VIRGIN BINDER 453D™ (copper-manganese-nickel-zinc), marketed by Belmont Metals, Inc.

The hard composite materials may be formed using any technique known in the art. A typical formation process for casting hard composite materials may begin by forming a mold in the shape of a desired component. Displacement materials such as, but not limited to, mold inserts, and additives necessary to obtain the desired shape may then be loaded into the mold.

The mold may then be loaded with the matrix powder. As the mold is being filled, a series of vibration cycles may be used to assist packing of the matrix powder, as necessary. The vibrations may help ensure a consistent density of the matrix powder within a desired range required to achieve the desired characteristics for the hard composite material.

The binder material may then be placed on top of the mold, and may be optionally covered with a flux layer. A cover or lid may be placed over the mold as necessary. The mold assembly and materials disposed therein may be preheated and then placed in a furnace.

When the melting point of the binder material is reached, the resulting liquid binder material infiltrates the matrix powder. The mold may then be cooled below a solidus temperature of the binder material to form the hard composite material.

The mold may then be opened to allow the hard composite material that is the shape of a desired component to be removed for use. Use of this procedure may allow for a variety of components to be formed from the hard composite materials described herein.

In the method 40, the matrix material 46 is sintered after being loaded into the mold 44. The term "sinter" in this context could refer to the solid state diffusion and bonding of matrix powder particles at a temperature below their melting point. The term can also refer to liquid phase sintering, transient liquid phase sintering, activated sintering or super-solidus liquid phase sintering. The term can also refer to a mechanical bond between particles using a liquid, such as the mechanical bond achieved when brazing.

The sintering temperature and time may vary depending on the binding agent and matrix powder. For example, sintering temperature may range from −250° C. to −1200° C., and sintering times may vary from 5 to 60 minutes.

If the D63™ material described above is used, suitable sintering may be achieved by inserting the mold 44 into a furnace preheated to approximately 1038° C. with a nitrogen atmosphere, and maintaining such temperature for approximately thirty minutes, or as needed for a binding agent mixed with the matrix material 46 to suitably bind the particles of the matrix material together.

After sintering, the matrix material 46 is preferably rigid and porous, so that during infiltration (described more fully below) the infiltration binder material can penetrate the rigid structure and bond the materials together. The rigid matrix material 46 is preferably 8% porous or greater, so that a porosity network in the material is interconnected.

Figure 5:
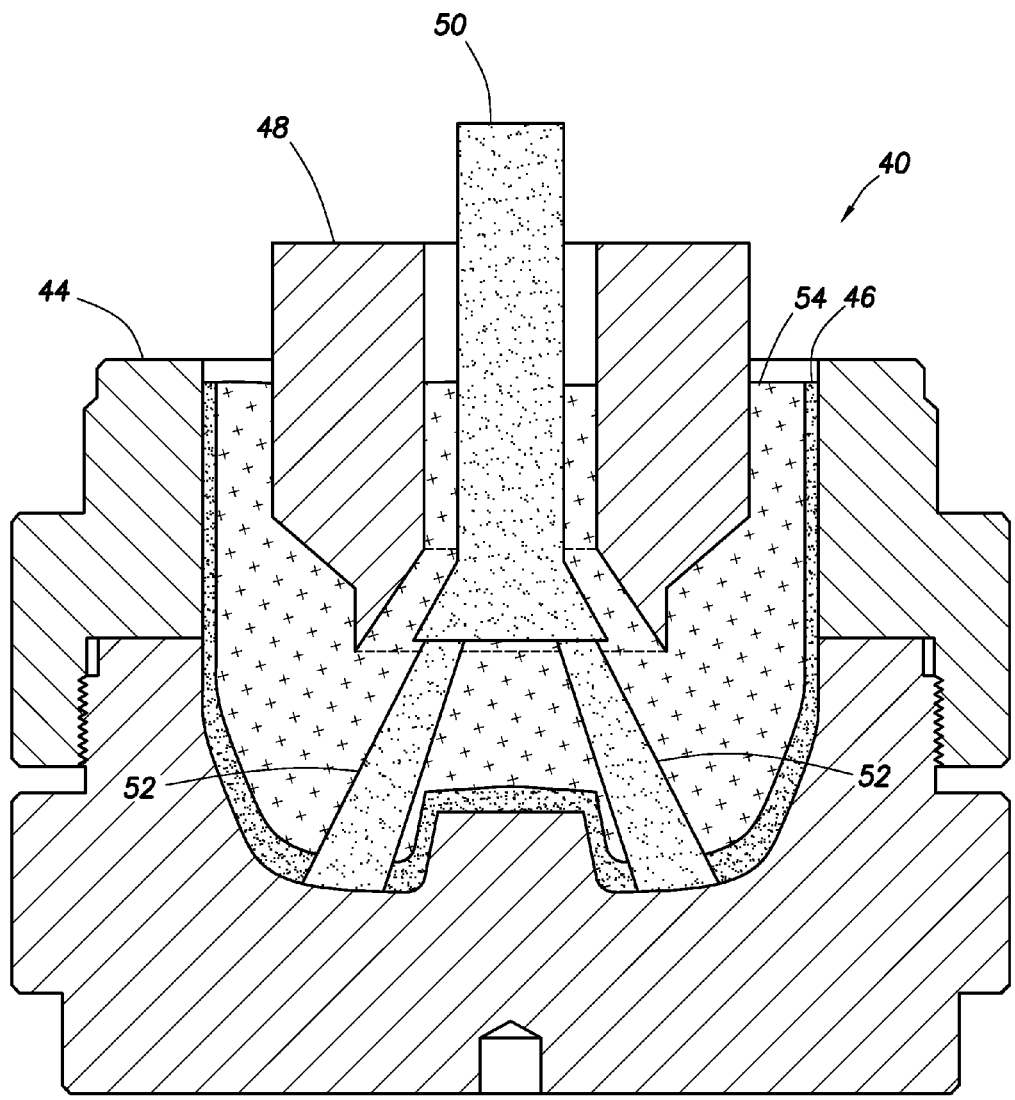

In FIG. 5, the mandrel 42 has been removed from the mold 44 after cooling, leaving the rigid sintered matrix material 46 as an outer layer in the mold. After the mandrel 42 is removed, an interior surface of the rigid matrix material 46 may be cleaned out (e.g., brushed, blown, vacuumed, etc.) to remove any loose sand, graphite or oxides (depending on the mandrel 42 material). Loose sand, graphite or oxide particles can inhibit proper infiltration of the binder material or act as an internal inclusion which could be detrimental to mechanical properties of the final structure.

Note that the matrix material 46 extends a substantial distance vertically along what will become the blade faces 30 of the drill bit. This result is achieved without the matrix material 46 (which can be relatively expensive) substantially filling the mold 44 below the vertical extent of the matrix material.

A metal blank 48 and displacement materials 50, 52 may be installed in the mold 44 to form specific features of the drill bit. For example, the displacement materials 50, 52 can be shaped to form the respective flow passages 36, 38 in the drill bit, other displacement materials may be used to form recesses for receiving the nozzles 32, etc. Suitable displacement materials can include sand and carbon.

A matrix support material 54 is then loaded into the mold 44, and preferably vibrated, so that it has a consistent density and entirely fills any voids. The material 54 is a support material, in that it serves to support the layer of matrix material 46 in the completed well tool 24.

One suitable material for the material 54 is P-90™ or P-100™ available from Kennametal, Inc. of Latrobe, Pa. USA. Another suitable material is Ancorsteel 30HP™ available from Hoeganaes Corporation of Cinnaminson, N.J. USA.

However, any suitable material may be used which is capable of supporting the matrix material 46 and performing any other functions desired of it in the well tool in which it is incorporated. For example, the material 54 can comprise any of the materials mentioned herein as being suitable for use in the matrix material 46 (and, vice versa, the material 46 can comprise any of the materials mentioned herein as being suitable for use in the material 54).

The material 54 can beneficially have greater toughness, ductility, tensile strength, impact strength, etc., and may be less expensive, as compared to the matrix material 46. However, the material 54 may not be as erosion resistant as the matrix material 46. To be clear, the material 54 is preferably also a matrix material, but is termed a "support" material herein to emphasize its role in supporting the erosion resistant layer of matrix material 46.

After loading the material 54 into the mold 44, the binder material and flux (not shown in FIG. 5) are placed on top of the matrix materials 46, 54 in the mold. A funnel, cap or other device may be used to facilitate the loading of matrix materials, binder materials, flux, etc. into the mold 44, and/or retaining such materials in the mold.

As described above, the matrix materials 46, 54 are then infiltrated with a binder material. This is preferably performed by preheating the mold 44 (with the binder material and optional flux on top of the matrix materials 46, 54), and then placing the mold into a furnace and heating until the binder material melts.

The hot, liquid binder material uniformly infiltrates both of the matrix materials 46, 54, and surrounds the blank 48 and displacement materials 50, 52. The mold 44 is then allowed to cool, and an assembly comprising the infiltrated matrix materials 46, 54, the blank 48 and the displacement materials 50, 52 is removed from the mold.

The displacement materials 50, 52 can be removed from the assembly using conventional techniques. The flow passages 36, 38 result from removal of the displacement materials 50, 52 in this example.

As depicted in FIG. 6, the well tool 24 is formed by machining the matrix materials 46, 54 (and optionally the blank 48). The passages 38 can be machined to appropriately receive the nozzles 32 therein.

The passage 36 and blank 48 may be machined to match particular features (such as, respective inner and outer diameters) of a metal connector 56. The inserts 28 can be secured in pockets formed in the drill bit blades by, for example, brazing, bonding, etc.

The connector 56 can be provided with internal or external threads for connecting the drill bit to a drill string. The connector 56 can be welded to the blank 48 as shown in FIG. 6. Alternatively, the connector 56 could be formed on the blank 48, threaded to the blank, or otherwise secured to the blank.

Although the method 40 is described above as being performed with a single mold 44, multiple molds could be used instead. For example, the mold used in the step depicted in FIG. 5 could be different from the mold used in the step depicted in FIG. 4, with the sintered matrix material 46 being transferred from one mold to another between the steps.

Figure 7:
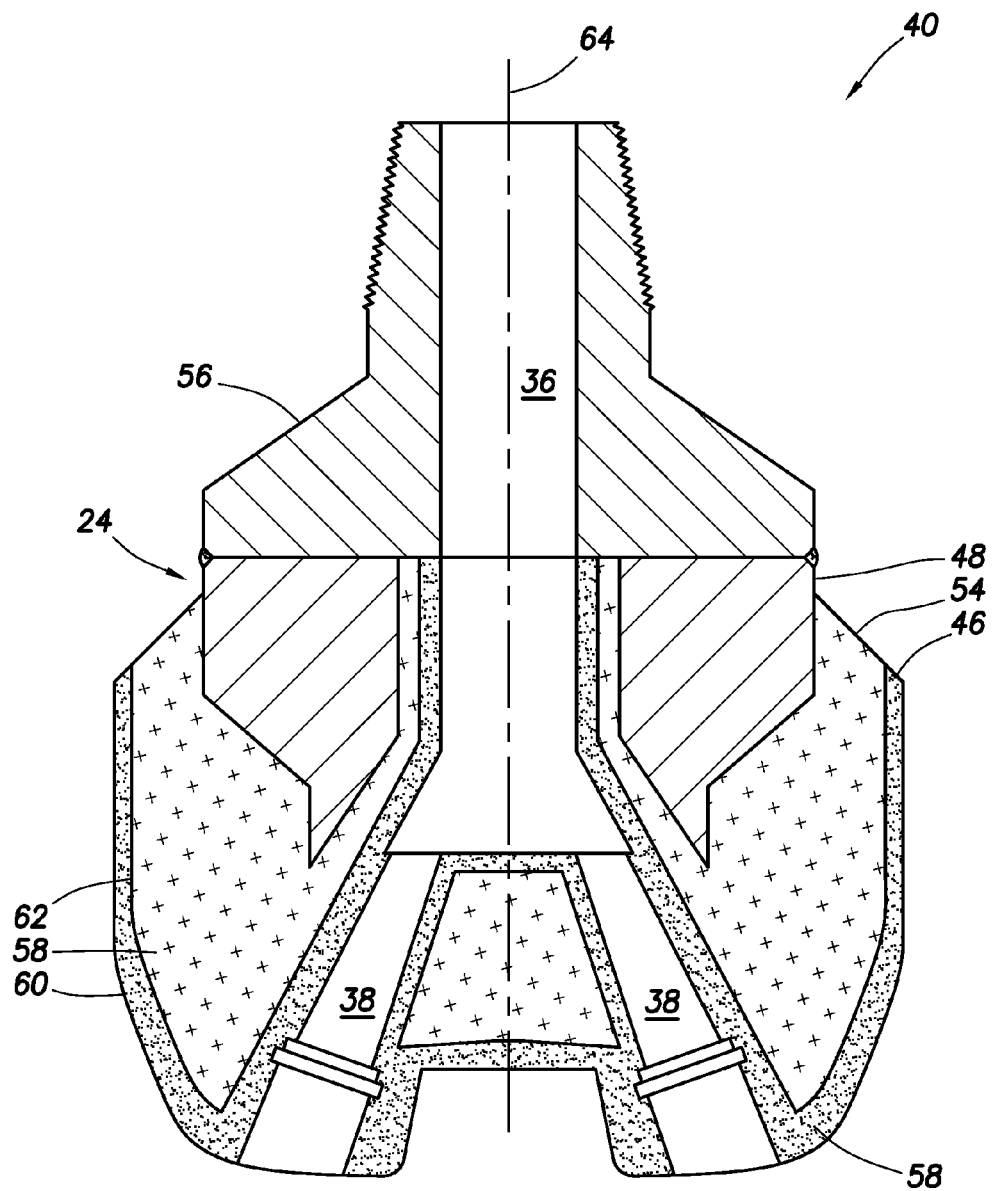
FIG. 7 is a representative cross-sectional view of another configuration of the well tool.

Referring additionally now to FIG. 7, another configuration of the well tool 24 is representatively illustrated. In this example, the well tool 24 has the erosion resistant layer 60 extending along walls of the passages 36, 38 internal to the well tool. The erosion resistant layer 60 is still external to the support layer 62, and is exposed to the erosive effects of fluid flow through the passages 36, 38. A multi-piece "clamshell"-type mandrel can be used for forming the erosion resistant layer 60 in this example.

It may now be fully appreciated that the above disclosure provides significant advancements to the art of constructing well tools. In the method 40 example described above, the matrix material 46 infiltrated with the binder material 58 forms a hard composite erosion resistant layer 60 on surfaces (such as, on the blade faces 30) exposed to erosion factors during drilling operations. The matrix material 54 infiltrated with the binder material 58 forms a hard composite support layer 62, which can be more ductile, tougher, less expensive, etc., as compared to the erosion resistant layer 60.

In some examples, the support layer 62, due to its enhanced toughness, ductility, impact resistance, etc., can allow for a drill bit to have larger blade standoff, and larger fluid courses and junk slots. Such drill bits can have improved rates of penetration and "balling" resistance.

A method 40 of manufacturing a well tool 24 is described above. In one example, the method 40 can comprise: loading a first matrix material 46 into a mold 44, then sintering the first matrix material 46 in the mold 44, and then loading a second matrix material 54 into the mold 44.

The method 40 can also include mixing a binding agent with the first matrix material 46. The mixing may be performed prior to loading the first matrix material 46 into the mold 44.

The first matrix material 46 can comprise a powder. The powder can extend greater than approximately 1.27 cm (or, in some examples, greater than approximately 2.54 cm) vertically along a surface of the mold 44 in the step of loading the first matrix material 46 into the mold 44. The first matrix material 46 does not necessarily extend only in the vertical direction, since the mold surface may be inclined, sloped, etc.

The powder may comprise a powdered tungsten carbide material. However, other materials may be used in other examples.

The method can include infiltrating the first and second matrix materials 46, 54 with a hot liquid binder material 58 after sintering the first matrix material 46.

The first matrix material 46 can have greater erosion resistance as compared to the second matrix material 54. The second matrix material 54 can have greater ductility, impact strength and/or toughness as compared to the first matrix material 46.

The loading step can comprise inserting the first matrix material 46 into a gap g between the mold 44 and a mandrel 42.

Another method 40 example of manufacturing a well tool 24 can comprise: forming a rigid layer 60 from a powdered first matrix material 46, and then infiltrating both the first matrix material 46 and a second matrix material 54 with a hot liquid binder material 58.

The rigid layer 60 forming step can include loading the first matrix material 46 into a mold 44 and sintering the first matrix material 46. The sintering is performed after the loading in this example. The infiltrating is performed after the sintering.

A well tool 24 example described above can include a longitudinal axis 64 (see FIG. 6), an erosion resistant layer 60 exposed to one or more erosive factors when the well tool 24 is installed in a well, and a support layer 62 which supports the erosion resistant layer 60. In this example, the erosion resistant and support layers 60, 62 can comprise respective first and second matrix materials 46, 54, and the erosion resistant layer 60 can extend greater than approximately 1.27 cm (or, in some examples, greater than approximately 2.54 cm) in a direction parallel to the longitudinal axis 64.

The layer 60 does not necessarily extend only in the direction parallel to the longitudinal axis, since the surface on which the layer is used may be inclined, sloped, etc.

The first and second matrix materials 46, 54 may be infiltrated with a same binder material 58.

The erosion resistant layer 60 can have a thickness of at least approximately 0.25 cm.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of manufacturing a well tool, the method comprising:
   installing a mandrel in a mold and defining a gap between the mandrel and a surface of the mold;
   loading a first matrix material comprising a powder into the gap, wherein the first matrix material extends along the surface of the mold;
   sintering the first matrix material in the gap;
   removing the mandrel from the mold thereby removing the gap;
   loading a second matrix material into the mold: and
   infiltrating the sintered first matrix material and the second matrix material with a hot liquid binder material in the mold.

2. The method of claim 1, further comprising before the sintering, mixing a binding agent with the first matrix material.

3. The method of claim 1, wherein the gap has a length greater than approximately 1.27 cm allowing for the first matrix material to extend greater than 1.27 cm along the surface of the mold.

4. The method of claim 1, wherein the gap has a length greater than approximately 2.54 cm allowing for the first matrix material to extend greater than 2.54 cm along the surface of the mold.

5. The method of claim 1, wherein the powder comprises a powdered tungsten carbide material.

6. The method of claim 1, wherein the first matrix material has greater erosion resistance as compared to the second matrix material.

7. The method of claim 1, wherein the second matrix material has greater ductility as compared to the first matrix material.

8. The method of claim 1, wherein the second matrix material has greater toughness as compared to the first matrix material.

9. The method of claim 1, wherein the second matrix material has greater impact strength as compared to the first matrix material.

10. A method of manufacturing a well tool, the method comprising:
    installing a mandrel having a longitudinal axis that is oriented vertically in a in a mold and defining a vertical gap between the mandrel and a surface of the mold;
    loading a first matrix material comprising a powder into the vertical gap, wherein the gap has a length greater than approximately 1.27 cm allowing for the first matrix material to extend vertically greater than 1.27 cm along the surface of the mold;
    sintering the first matrix material in the gap;
    removing the mandrel from the mold thereby removing the gap;
    loading a second matrix material into the mold and
    infiltrating the sintered first matrix material and the second matrix material with a hot liquid binder material in the mold.

11. The method of claim 10, further comprising before the sintering, mixing a binding agent with the first matrix material.

12. The method of claim 10, wherein the gap length is greater than approximately 2.54 cm allowing for the first matrix material to extend greater than 2.54 cm along the surface of the mold.

13. The method of claim 10, wherein the powder comprises a powdered tungsten carbide material.

14. The method of claim 10, wherein the first matrix material has greater erosion resistance as compared to the second matrix material.

15. The method of claim 10, wherein the second matrix material has greater ductility as compared to the first matrix material.

16. The method of claim 10, wherein the second matrix material has greater toughness as compared to the first matrix material.

17. The method of claim 10, wherein the second matrix material has greater impact strength as compared to the first matrix material.

* * * * *